(12) United States Patent
Stephenson et al.

(10) Patent No.: US 11,491,594 B2
(45) Date of Patent: Nov. 8, 2022

(54) TOOLING ASSEMBLY WITH INTERNAL COOLANT PASSAGES FOR MACHINES

(71) Applicant: Ford Motor Company, Dearborn, MI (US)

(72) Inventors: David Stephenson, Detroit, MI (US); Timothy G. Beyer, Troy, MI (US); Michael A. Kopmanis, Monroe, MI (US); David Ozog, Brownstown, MI (US); William E. Dowling, Jr., Saline, MI (US)

(73) Assignee: Ford Motor Company, Dearborn, MI (US)

( * ) Notice: Subject to any disclaimer, the term of this patent is extended or adjusted under 35 U.S.C. 154(b) by 231 days.

(21) Appl. No.: 15/864,031

(22) Filed: Jan. 8, 2018

(65) Prior Publication Data
US 2019/0210174 A1  Jul. 11, 2019

(51) Int. Cl.
*B23Q 3/157* (2006.01)
*B23B 27/10* (2006.01)
(Continued)

(52) U.S. Cl.
CPC ............. *B23Q 3/155* (2013.01); *B23C 5/28* (2013.01); *B23Q 11/1023* (2013.01);
(Continued)

(58) Field of Classification Search
CPC . Y10T 409/304032; Y10T 409/304088; Y10T 409/309408; Y10T 409/30952; Y10T 408/45; Y10T 408/453; Y10T 408/455; Y10T 408/458; Y10T 408/46; Y10T 407/14; Y10T 409/303976–304088; Y10T 408/44–46; B23Q 11/10; B23Q 11/1015;
(Continued)

(56) References Cited

U.S. PATENT DOCUMENTS 589,576 A * 9/1897 Rickey ................ B23B 51/0486
  408/59
2,148,805 A * 2/1939 Cogsdill ................. B23B 51/06
  72/100
(Continued)

FOREIGN PATENT DOCUMENTS

EP  3219421  9/2017
JP  3025383 U * 6/1996
(Continued)

OTHER PUBLICATIONS

English Translation of JP-3025383-U (Year: 1996).*
(Continued)

*Primary Examiner* — Erica E Cadugan
*Assistant Examiner* — Michael Vitale
(74) *Attorney, Agent, or Firm* — Burris Law, PLLC

(57) ABSTRACT

The present disclosure is directed toward a tooling assembly for a machine having an automatic tool changing system. The tooling assembly includes a holder, a tool body, and an internal passage defined within and extending through the holder and the tool body. The holder includes a machine interface configured to engage with a spindle of the machine. The internal passage is operable to have a coolant fluid flow within, and has a stem channel and a curved channel extending from the stem channel.

12 Claims, 5 Drawing Sheets

(51) Int. Cl.
  *B23C 5/28* (2006.01)
  *B23B 51/06* (2006.01)
  *B23Q 11/10* (2006.01)
  *B23Q 3/155* (2006.01)
(52) U.S. Cl.
  CPC ....... *B23B 51/068* (2022.01); *B23C 2210/285* (2013.01); *B23Q 3/15724* (2016.11); *Y10T 408/45* (2015.01); *Y10T 409/304032* (2015.01); *Y10T 483/1733* (2015.01); *Y10T 483/1891* (2015.01)
(58) Field of Classification Search
  CPC .............. B23Q 11/1023; B23Q 11/103; B23Q 11/1038; B23Q 11/1046; B23Q 11/1076; B23Q 11/1084; B23Q 11/1092; B23B 27/10; B23B 51/06; B23B 2231/24; B23B 2250/12; B23B 51/068; B23C 5/28; B23C 2250/12; Y10S 29/092
  USPC ........ 175/215; 299/81.1, 81.2; 409/135–137; 408/56–61; 29/DIG. 92; 407/11
  See application file for complete search history.

(56) References Cited

U.S. PATENT DOCUMENTS

| | | | | |
|---|---|---|---|---|
| 2,325,973 | A * | 8/1943 | Nurnberger | B23B 51/06 408/59 |
| 2,541,849 | A * | 2/1951 | Villeneuve | B23B 51/06 76/108.6 |
| 2,946,244 | A * | 7/1960 | Maynard | B23Q 1/0036 408/1 R |
| 3,040,605 | A * | 6/1962 | Andreasson | B23B 51/02 408/59 |
| 3,073,189 | A * | 1/1963 | Paige | B23B 51/02 408/59 |
| 3,096,668 | A * | 7/1963 | Maynard | B23Q 11/1084 408/59 |
| 3,293,727 | A * | 12/1966 | Simms | B23Q 1/0036 407/11 |
| 3,504,575 | A * | 4/1970 | Masao | B21K 5/04 76/108.1 |
| 3,555,935 | A * | 1/1971 | Dorrenberg | B21C 23/085 76/108.6 |
| 3,791,660 | A * | 2/1974 | Bostley | B23B 51/06 279/20 |
| 4,813,823 | A * | 3/1989 | Bieneck | B21C 23/147 408/144 |
| 4,919,013 | A * | 4/1990 | Smith | B22F 7/06 419/37 |
| 5,174,692 | A * | 12/1992 | Martin | B23B 51/0081 408/56 |
| 5,275,516 | A * | 1/1994 | Liaw | B23B 31/1253 279/20 |
| 5,433,280 | A * | 7/1995 | Smith | E21B 10/55 175/336 |
| 5,634,747 | A * | 6/1997 | Tukala | B23B 51/0493 408/224 |
| 5,676,499 | A * | 10/1997 | Tukala | B23B 51/0493 408/223 |
| 5,685,671 | A * | 11/1997 | Packer | B23C 5/1018 407/118 |
| 5,980,166 | A * | 11/1999 | Ogura | B23B 51/02 408/144 |
| 6,045,301 | A * | 4/2000 | Kammermeier | B23B 51/06 408/230 |
| 6,059,702 | A * | 5/2000 | Winkler | B23Q 3/157 408/56 |
| 6,210,083 | B1 * | 4/2001 | Kammermeier | B23B 51/06 279/20 |
| 6,283,682 | B1 * | 9/2001 | Plummer | B23B 51/02 408/144 |
| 2003/0170087 | A1 * | 9/2003 | Sugata | B23Q 11/1023 409/136 |
| 2005/0031423 | A1 * | 2/2005 | Kugelberg | B22F 3/22 408/230 |
| 2005/0214082 | A1 * | 9/2005 | Dasch | B23B 51/06 408/59 |
| 2007/0283786 | A1 * | 12/2007 | Kappmeyer | B22F 3/1055 76/101.1 |
| 2008/0003072 | A1 * | 1/2008 | Kim | B23B 51/0009 408/199 |
| 2008/0279644 | A1 * | 11/2008 | Endres | B23B 27/10 408/56 |
| 2010/0150673 | A1 * | 6/2010 | Schneider | B21F 7/00 408/59 |
| 2010/0166510 | A1 * | 7/2010 | Inamasu | B23C 5/10 407/11 |
| 2010/0272529 | A1 * | 10/2010 | Rozzi | B23C 5/207 408/56 |
| 2011/0268518 | A1 * | 11/2011 | Sampath | B23B 51/02 408/59 |
| 2012/0308319 | A1 * | 12/2012 | Sampath | B23B 51/02 408/59 |
| 2013/0233620 | A1 * | 9/2013 | Rankin | E21B 17/1078 175/57 |
| 2013/0302101 | A1 * | 11/2013 | Scanlon | B23B 51/06 408/59 |
| 2013/0302748 | A1 * | 11/2013 | Friedrichs | A61C 1/055 433/82 |
| 2015/0298221 | A1 | 10/2015 | Ach et al. | |
| 2016/0175938 | A1 | 6/2016 | Kaufmann | |
| 2016/0214187 | A1 * | 7/2016 | Fukata | B23C 5/10 |
| 2016/0339523 | A1 | 11/2016 | Graf et al. | |
| 2018/0185939 | A1 * | 7/2018 | Ning | B23D 77/02 |
| 2019/0337059 | A1 * | 11/2019 | Hughey | B23C 5/28 |

FOREIGN PATENT DOCUMENTS

| | | | |
|---|---|---|---|
| JP | 2012200836 A | * | 10/2012 |
| JP | 2013193159 A | * | 9/2013 |
| JP | 2016147326 | | 8/2016 |
| WO | 2017/003343 | | 1/2017 |
| WO | WO-2018166889 A1 | * | 9/2018 ............. B23P 15/34 |

OTHER PUBLICATIONS

Kromanis, A. et al., Design of Internally Cooled Tools for Dry Cutting, 9th Inernational DAAAM Baltic Conference, Industrial Enginnering, Apr. 2014, Estonia, available at URL http://innomet.ttu.ee/daaam14/proceedings/Production%20Engineering%20and%20Management/Kromanis.pdf.

Benedict, Hanover Engineers Make 3D Printed Bone Drill With Internal Cooling System, Jul. 11, 2017, available at URL https://www.3ders.org/articles/20170711-hanover-engineers-make-3d-printed-bone-drill-with-internal-cooling-system.html.

* cited by examiner

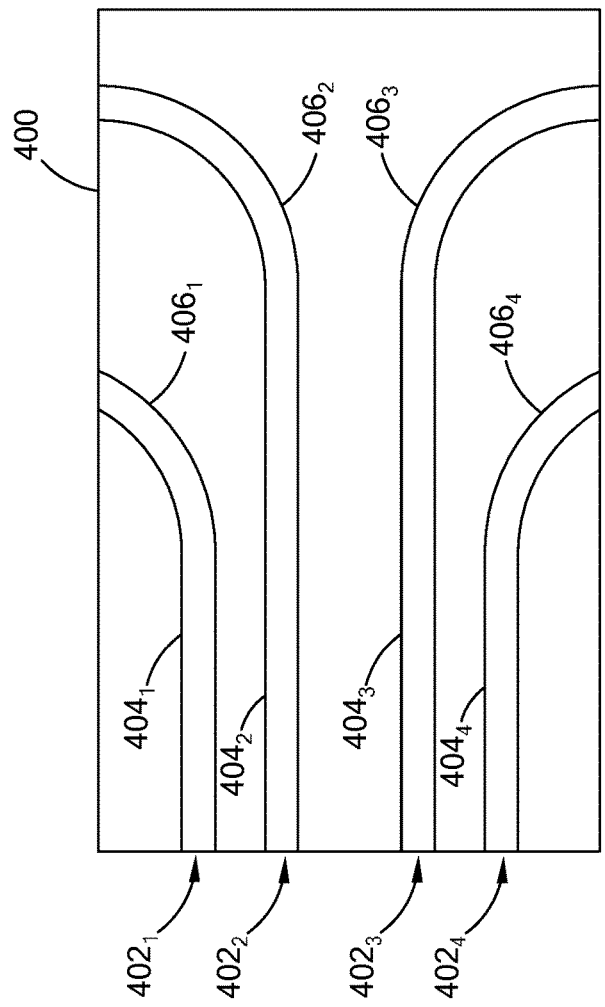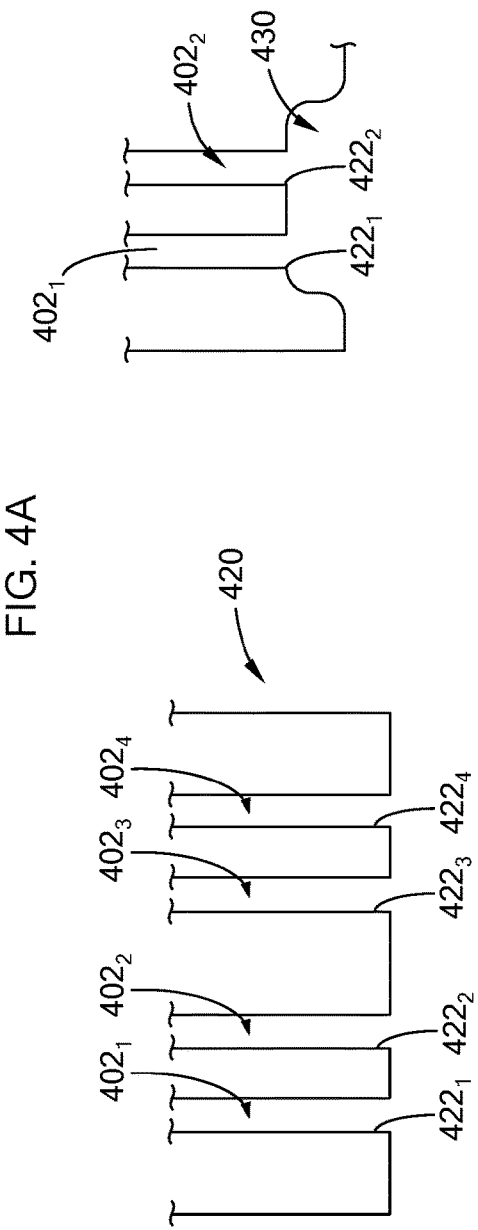

TOOLING ASSEMBLY WITH INTERNAL COOLANT PASSAGES FOR MACHINES

FIELD

The present disclosure relates to coolant passage for a tooling assembly.

BACKGROUND

The statements in this section merely provide background information related to the present disclosure and may not constitute prior art.

Computer numerical control (CNC) machines having an automatic tool changing system generally include multiple tooling assemblies that are attachable to a spindle of the machine. The tooling assemblies can be used for forming complex features in high volume machining. This type of tooling assembly typically have a steel tool body to which inserts of hard tool materials, such as cemented tungsten carbide or polycrystalline diamond, are affixed at points where material is to be removed. Examples of such tooling assemblies include multi-diameter boring bars and large milling cutters.

As the tooling assembly machines a workpiece, friction between the two components can generate heat and material machined from the workpiece may begin to accumulate at the cutting edges of the tool. Accordingly, in many applications, a coolant fluid (e.g., liquid and/or gas) is routed through internal passages to each cutting edge to prevent material buildup and control temperature. For example, a minimum quantity lubrication (MQL) machine uses a combination of lubricant and compressed air to coat the interface of the tooling assembly with a thin film to prevent heat buildup through friction reduction. In another form, the CNC machine may be a fluid cooling machine that uses water based coolant to cool the tooling assembly and expel material bits machined from the workpiece.

In both machines, coolant passes through a channel provided within the spindle to the internal passage of the tooling assembly. These passages are typically straight uniform passages that are formed by, for example, drilling for water-based coolant CNC machines or wire electrodischarge machining for minimum quantity lubrication (MQL) machines. Both methods are prone to creating passages that have missed connections and/or overshoot, which can cause backpressure, turbulent fluid flow, and can diminish the life of the tool.

SUMMARY

This section provides a general summary of the disclosure, and is not a comprehensive disclosure of its full scope or all of its features.

In one form, the present disclosure is directed toward a tooling assembly for a machine having an automatic tool changing system. The tooling assembly includes a holder, a tool body, and an internal passage defined within and extending through the holder and the tool body. The holder includes a machine interface at one end, and the machine interface is configured to engage with a spindle of the machine. The tool body is disposed at the other end of the holder. The internal passage is operable to have a coolant fluid flow within, and has a stem channel and a curved channel extending from the stem channel.

In another form, the internal passage has a tapered portion connecting the stem channel and the curved channel.

In yet another form, the holder and the tool body are made of one of steel, molybdenum, tungsten, and cemented tungsten carbide.

In one form, the internal passage includes a plurality of the curved channels branching from the stem channel of the internal passage.

In another form, the machine interface defines an inlet, the tool body defines a plurality of outlets, and the internal passage has a plurality of the curved channels branching from the stem channel. The internal passage extends from the inlet of the machine interface to the outlets of the tool body. The stem channel is fluidly coupled to the inlet and each of the plurality of the curved channels are fluidly coupled to an outlet from among the plurality of the outlets.

In yet another form, the internal passage has one or more linear channels branching from the stem channel, and each of the linear channels is fluidly coupled to an outlet from among the plurality of outlets.

In one form, the tooling assembly further includes a plurality of the internal passages defined within and extending through the holder and the tool body.

In another form, the machine interface defines a plurality of inlets, the tool body defines a plurality of outlets, and each of the plurality of the internal passages extend from an inlet from among the plurality of inlets to one or more outlets from among the plurality of outlets. The stem channel of each of the plurality of the internal passages fluidly couples to the inlet and the curved channel fluidly couples to the outlet.

In yet another form, one or more internal passages from among the plurality of the internal passages has a plurality of the curved channels branching from the stem channel. Each of the plurality of the curved channels connects to an outlet from among the plurality of outlets.

In one form, the present disclosure is directed toward, a tooling assembly for a machine having an automatic tool changing system. The tooling assembly includes a holder, a tool body, and an internal passage. The holder includes a machine interface at one end, and the machine interface is adapted to engage with a spindle of the machine and defines an inlet. The tool body is disposed at the other end of the holder, and defines a plurality of outlets. The internal passage is defined within and through the holder and the tool body. The internal passage is operable to have a coolant fluid flow within. The internal passage has a stem channel and a curved channel. The stem channel extends from the inlet and the curved channel extends from the stem channel and fluidly couples to an outlet from among the plurality of outlets.

In another form, the internal passage has a transition portion connecting the stem channel and the curved channel. A size of the transition portion decreases from a first cross-sectional dimension at a first end to a second cross-sectional dimension at a second end opposite the first end. The first end is fluidly coupled to the stem channel and the second end is fluidly coupled to the curved channel.

In yet another form, the internal passage includes a plurality of the curved channels branching from the stem channel, and each of the curved channels fluidly couple to an outlet from among the plurality of outlets.

In one form, the internal passage has one or more linear channels extending from the stem channel, and each of the one or more linear portions fluidly couple to an outlet from among the plurality of outlets.

In another form, the tooling assembly further includes a plurality of the internal passages. The machine interface defines a plurality of the inlets, and the stem channel of each of the internal passages is fluidly coupled to an inlet from among the plurality of the inlets.

In yet another form, the holder defines a sump cavity adjacent to the inlets.

In one form, a cross-sectional size of the curved channel varies from the stem channel to the outlet.

In another form, the tooling assembly further includes a plurality of cutting inserts disposed along an outer surface of the tool body.

In one form, the present disclosure is directed toward a tooling assembly that includes a tool and multiple internal passages. The tool includes a machine interface at one end, and defines an inlet at the one end and multiple outlets at the other end. The machine interface is configured to engage with a machine spindle. The multiple internal passages are defined within the tool, and each internal passage has a stem connected to the inlet, and a curved channel extending from the stem and connected to one of the outlets.

In another form, a cross-sectional size of the curved channel varies from the stem to the outlet.

In yet another form, the internal passage has a tapered portion connecting the stem and the curved channel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4A is a partial cross-sectional of multiple internal passages disposed in a tooling assembly in accordance with the teachings of the present disclosure;

FIG. 4B illustrates multiple inlets coupled to the internal passages of the tooling assembly of FIG. 4A in accordance with the teachings of the present disclosure;

FIG. 4C illustrates a sump cavity defined adjacent to an inlet that is coupled to the internal passage of the tooling assembly of FIG. 4A in accordance with the teachings of the present disclosure;

Figure 1:
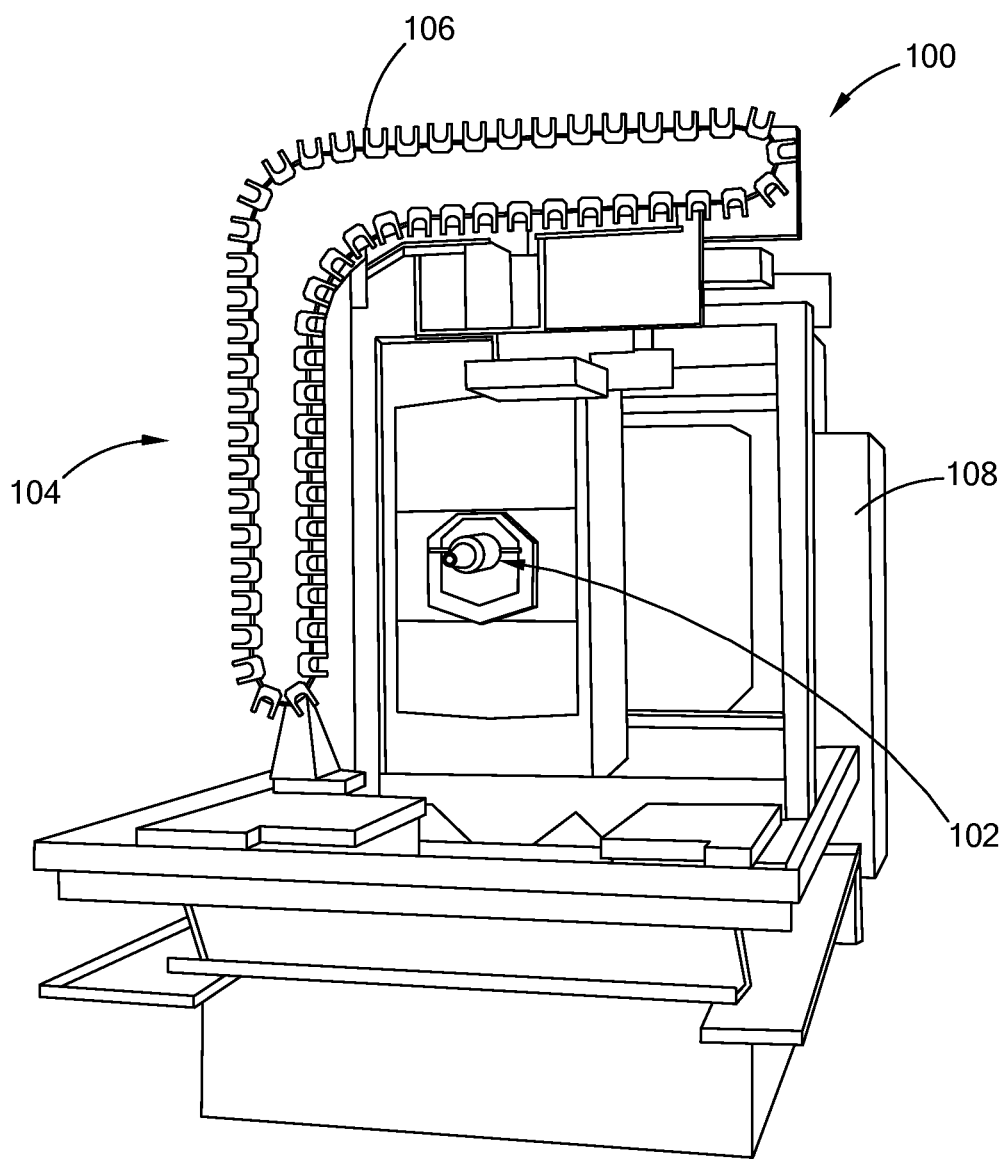
FIG. 1 is a perspective view of a computer numerical control (CNC) machine having an automatic tool changing system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a computer numerical control (CNC) machine 100 is operable to form complex parts, such as gear sets, torque converters, etc, from a workpiece. In addition to other components, the CNC machine 100 generally includes a spindle 102, an automatic tool changing system 104 having a magazine 106, and a controller 108 for executing one or more programs to operate the CNC machine 100. While not shown in FIG. 1, the magazine 106 may store tooling assemblies, such as multi-diameter boring bars and milling cutters with cutting inserts disposed on the cutter.

In operation, the automatic tool changing system 104 is operable by the controller 108 to load the spindle 102 with a tooling assembly from the magazine 106. The spindle 102 is aligned with the workpiece and machines the workpiece by driving the tooling assembly attached thereon. As the tooling assembly machines the workpiece, friction between the two components can generate heat and material machined from the workpiece may begin to accumulate at the cutting edges of the tool.

Figure 2:
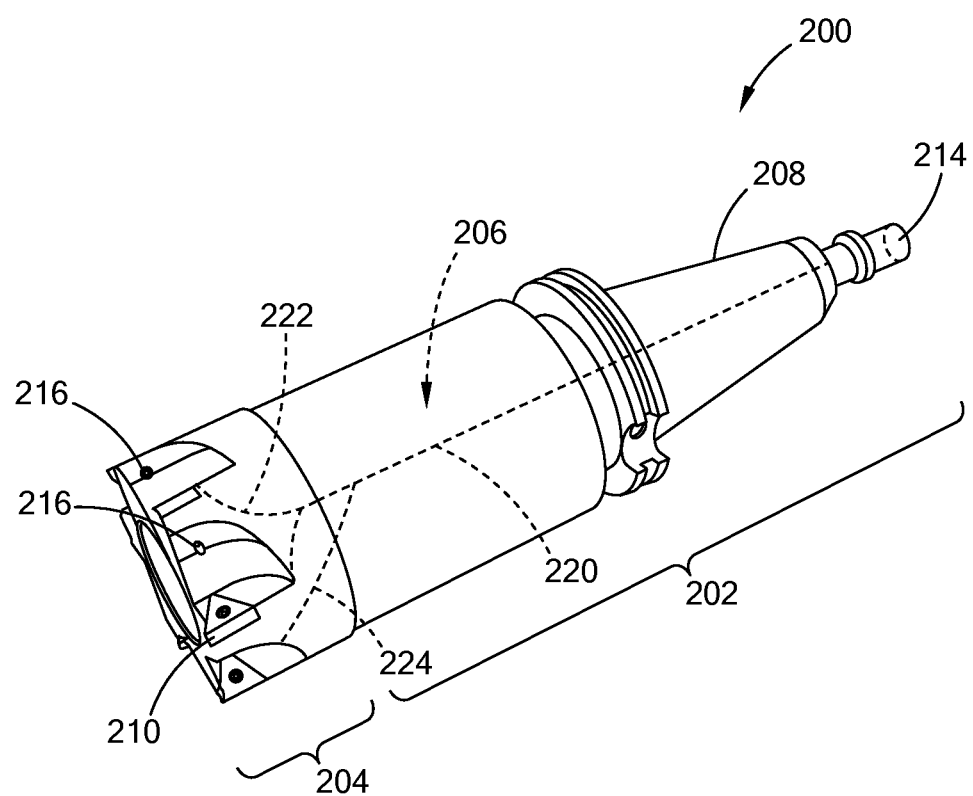
FIG. 2 is a perspective view of a tooling assembly for the CNC machine and having an internal passage in accordance with the teachings of the present disclosure.

To prevent material build-up and reduce heat, the tooling assemblies have an internal coolant passage for receiving a coolant fluid, such as liquid and/or gas based coolants. Specifically, referring to FIG. 2, a tooling assembly 200 includes a holder 202, a tool body 204, and one or more internal passages 206 defined within. The tooling assembly 200 is configured to attach to a spindle of a CNC machine having an automatic tool changing system, similar to the one illustrated in FIG. 1.

The holder 202 has a machine interface 208 that is disposed at one end of the holder 202 and is configured to engage with the spindle of the machine. The tool body 204 is disposed at the other end of the holder 202 and includes one or more cutting edges 210. The tool body and the holder may be collectively referred to as a tool.

In one form, the cutting edges 210 are inserts of a hard tool material, such as cemented tungsten carbide or polycrystalline diamond, and are affixed at points along the outer surface of the tool body 204 where material is to be removed. While the tooling assembly 200 is illustrated as having a tool body formed like a cutting tool with inserts, the tooling assembly 200 may also have other suitable tool bodies. For example, the tool body may be a single- or multi-diameter boring bar. Thus, the teachings of the present disclosure are applicable to other tool bodies and should not be limited to those illustrated in the drawings.

The tooling assembly 200 is made of a hard material such as steel, molybdenum, tungsten, or cemented tungsten carbide. In one form, the holder 202 and the tool body 204 are formed as one solid part, and in another form, the holder 202 and the tool body 204 may be formed as separate parts that are joined together to form the tooling assembly 200. The tooling assembly 200 may be formed using three-dimensional (3D) printing system, such as metal binder jet printing.

The internal passage 206 extends from the holder 202 to the tool body 204. More particularly, the machine interface 208 of the holder 202 defines an inlet 214 that connects to a fluid channel provided within the spindle (not shown), and the tool body 204 defines one or more outlets 216. The internal passage 206 fluidly couples or in other words, connects the inlet 214 with the outlets 216 to dispense the coolant fluid. In one form, the outlets 216 are arranged adjacent to the cutting edges 210 of the tool body 204.

The internal passage 206 include a stem channel 220 and one or more curved channels 222 extending from the stem channel 220. In one form, in addition to the curved channels 222, the internal passage 206, includes a linear channel 224 extending from the stem channel 220. The inlet 214 is fluidly coupled to the stem channel 220, and one or more of the outlets 216 are fluidly coupled to a curved channel 222. For example, with no linear channels, the internal passage 206 includes one curved channel 222 for each of the outlets 216. In another example, the outlets 216 are connected to either a curved channel 222 or a linear channel 224.

Figure 3:
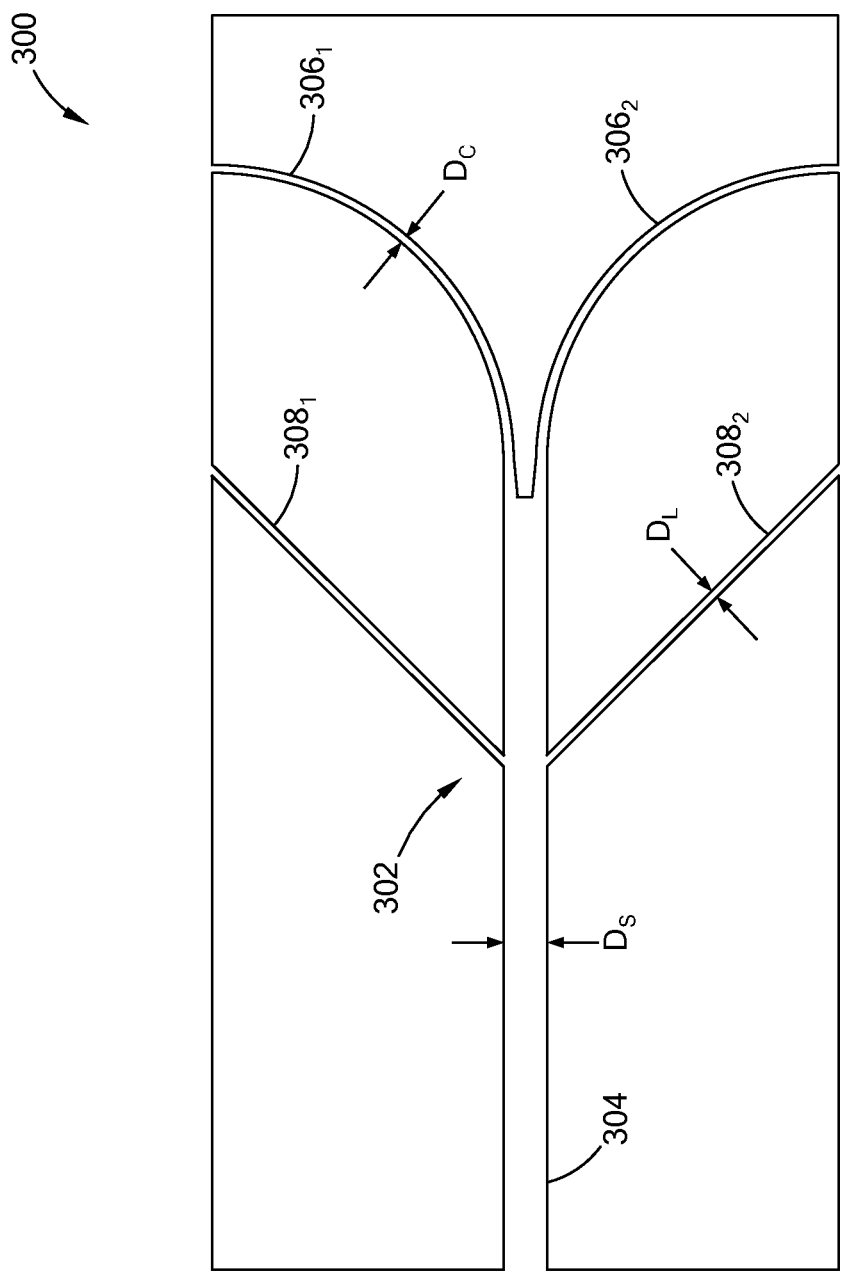
FIG. 3 is a partial cross-sectional view of an internal passage with curved channels branching from a stem channel in accordance with the teachings of the present disclosure.

Referring to FIG. 3, a cross-sectional view of a tooling assembly 300 having an internal passage 302 is illustrated. The internal passage 302 includes a stem channel 304 having multiple curved and linear channels branching from the stem channel 304. Specifically, two curved channels $306_1$ and $306_2$, and two linear channels $308_1$ and $308_2$ extend from the stem channel 304. The curved channels $306_1$ and $306_2$ may collectively be referred to as curved channels 306, and the linear channels $308_1$ and $308_2$ may collectively be referred to as linear channels 308.

The tooling assembly 300 has one internal passage 302 having one main stem channel 304 from which multiple curved channels 306 branch from. In another form, the tooling assembly is configured to have multiple internal passages, where each internal passage has a stem channel and at least one curved channel. For example, referring to FIG. 4A, a tooling assembly 400 includes internal passages $402_1$ to $402_4$ that are collectively referred to as internal passages 402. Each of the internal passages 402 includes a stem channel 404 ($404_1$ to $404_4$ in figure) and at least one curved channel 406 (i.e., $406_1$ to $406_4$ in figure).

The holder of the tooling assembly 400 can be figured in various suitable ways to fluidly couple the internal passages 402 to the fluid channel of the spindle. For example, referring to FIG. 4B, a holder 420 for the tooling assembly 400 defines a separate inlet 422 (i.e., $422_1$ to $422_4$ in figure) for each of the internal passages 402. The inlets 422 may directly abut with the fluid channel of the spindle to receive the coolant fluid. Alternatively, as illustrated in FIG. 4C, the holder 420 defines one or more sump cavities 430 adjacent to the inlets 422 to equalize pressure and ensure even coolant distribution from two or more adjacent internal passages 402.

Each of the internal passages 402 of the tooling assembly 400 has one curved channel 406 extending from its respective stem 404. In another form, one or more of the internal passage 402 may have multiple curved channels 406 extending from the stem 404. For example, internal passages $404_3$ and $404_3$ may be replaced with one internal passage having a stem and at least two curve channels that extend to the outlets of channels $406_2$ and $406_3$. In another form, in addition to a curved channel, some of the internal passages 402 may have a linear channel extending from the stem channel.

The cross-section of the internal passage described herein may be a circular-shape, an oval-shape, or other suitable rounded shaped for inhibiting back pressure and loss of fluid pressure. The size or dimensions of the cross-section may be different between the stem channel, the curved channel, and the linear channel. For example, referring to FIG. 3, with the internal passage 302 having a circular cross-section, the diameter of the stem channel 304 (i.e., $D_S$) is greater than that of the curved channels 306 ($D_C$) and the linear channels 308 (i.e., $D_L$).

Figure 5:
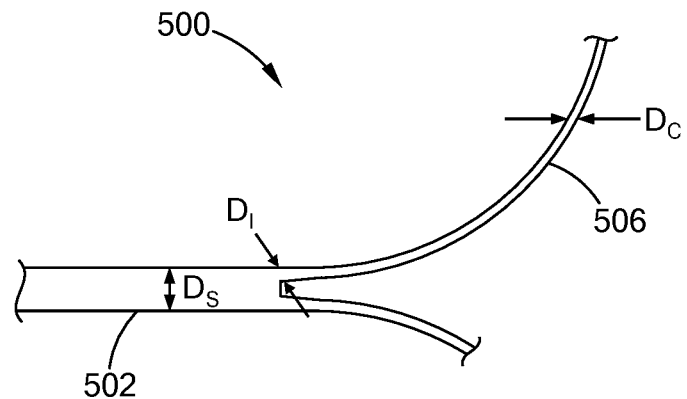
FIG. 5 illustrates a section of an internal passage having a transition portion disposed between a stem channel and a curved channel in accordance with the teachings of the present disclosure.

To further control the flow of coolant fluid, the internal passage may be configured to gradually change the cross-sectional dimensions between the various channels. For example, referring to FIG. 5, in one form, an internal passage 500 includes a stem channel 502, a curved channel 504, and a transition portion (i.e., tapered portion) 506 disposed between the stem channel 502 and the curved channel 504. With the internal passage 500 having a circular shape, the transition portion 506 has a varying diameter that gradually decreases from an initial diameter ($D_I$) to that of the curved channel 504 ($D_C$). In other words, a size of the transition portion 506 decreases from a first cross-sectional dimension (e.g., $D_I$) at a first end to a second cross-sectional dimension (e.g., $D_C$) at a second end opposite the first end. The first end is fluidly coupled to the stem channel 502 and the second end is fluidly coupled to the curved channel 504. The transition portion may be incorporated with the internal passages illustrated in FIGS. 3 and 4A.

Figure 6:
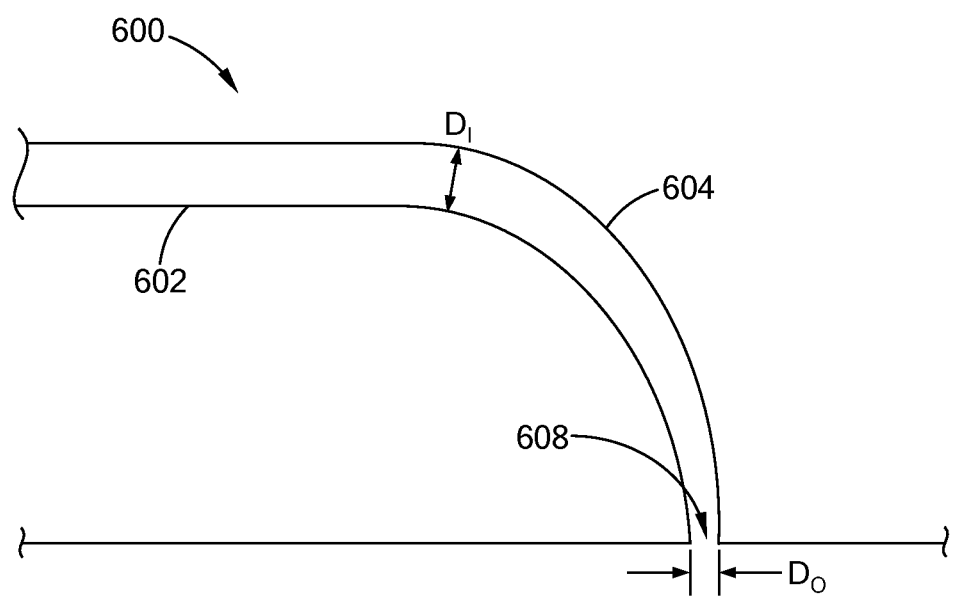
FIG. 6 illustrates a section of an internal passage having a curved channel with varying dimensions in accordance with the teachings of the present disclosure.

In another form, the curved channel may be configured to have a cross-section that varies in size. For example, as shown in FIG. 6, an internal passage 600 having a circular cross-section includes a stem channel 602 and a curved channel 604. The diameter of the curved channel 604 tapers from an initial diameter ($D_I$) to a diameter of an outlet 608 ($D_O$). The curved channel having a varying cross-sectional dimension may be incorporated with the internal passages illustrated in FIGS. 3 and 4A.

In the following, variations described with respect to the curved channel are also applicable to the linear channels provided in the internal passage. For example, a transition portion may be provided between a linear channel and the stem channel, and the linear channel may have a varying cross-sectional dimension.

The structural characteristics of the internal passage(s) of the tooling assembly is dependent on various parameters such as the type of coolant fluid being used, flow properties of the fluid, and technical specifications of the machine receiving the tool. For example, for a MQL type of machine, parameters to consider include but are not limited to, average airflow speed, flow rate of the air, turbulence set point, lubricant droplet size, lubricant droplet distribution, and net oil discharged. It should be readily understood that various other parameters may be used to determine the structural characteristics of the internal passage.

Tooling assemblies having the internal passage of the present disclosure include on or more curved passages that can improve the flow of coolant fluid through the tool. For example, for a MQL machine, the curved passages can improve air flow, reduce air boosting, and improve tool life. In addition, the tooling assembly having multiple internal passages with curved passages, inhibit backpressure, improve flow rates, and ensure even flow to all edges under varying input pressure conditions for both wet and MQL machining.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. A tooling assembly for a machine having an automatic tool changing system, the tooling assembly comprising:
a holder disposed about a rotational axis and including a machine interface at one end, wherein the machine interface is configured to engage with a spindle of the machine to be rotated about the rotational axis by the spindle;

a tool body disposed at the other end of the holder, the tool body defining a first internal passage and a second internal passage, wherein the first internal passage includes a first straight channel and a first curved channel, one end of the first straight channel defining an inlet of the first internal passage, the inlet of the first internal passage being open through an end of the tool body that is proximate the holder to receive a coolant fluid from the holder, an opposite end of the first straight channel being open to the first curved channel to provide the coolant fluid to the first curved channel, wherein the first curved channel curves outward from the first straight channel to an outlet of the first internal passage such that the outlet of the first internal passage is a greater distance from the rotational axis than the first straight channel is, the outlet of the first internal passage being open to an exterior of the tool body, wherein the second internal passage includes a second straight channel and a second curved channel, one end of the second straight channel defining an inlet of the second internal passage, the inlet of the second internal passage being open through the end of the tool body that is proximate the holder to receive the coolant fluid from the holder, an opposite end of the second straight channel being open to the second curved channel to provide the coolant fluid to the second curved channel, wherein the second curved channel curves outward from the second straight channel to an outlet of the second internal passage such that the outlet of the second internal passage is a greater distance from the rotational axis than the second straight channel is, the outlet of the second internal passage being open to the exterior of the tool body, wherein the outlet of the second internal passage is located between the outlet of the first internal passage and the end of the tool body that is proximate the holder.

2. The tooling assembly of claim 1, wherein the tool body defines a tapered channel portion that connects the first straight channel to the first curved channel or the second straight channel to the second curved channel.

3. The tooling assembly of claim 1, wherein the holder and the tool body are made of one of steel, molybdenum, tungsten, and cemented tungsten carbide.

4. The tooling assembly of claim 1, wherein the tool body defines a third curved channel branching from the first straight channel or the second straight channel.

5. The tooling assembly of claim 1, wherein:
the holder defines an inlet of the first internal passage open directly to an exterior of the holder and an inlet of the second internal passage open directly to the exterior of the holder independently of the inlet of the first internal passage.

6. The tooling assembly of claim 1, wherein the holder defines a sump cavity open directly to an exterior of the holder, wherein an inlet of the first internal passage is open to the sump cavity and an inlet of the second internal passage is open to the sump cavity.

7. The tooling assembly of claim 1, wherein the first curved channel curves outward along an arcuate path and the first straight channel joins the first curved channel.

8. A tooling assembly comprising:
a tool disposed about a rotational axis and including a machine interface at one end and defining multiple outlets at the other end, the multiple outlets including a first outlet, a second outlet, and a third outlet, wherein the machine interface is configured to engage with a machine spindle to be rotated by the spindle about the rotational axis; and multiple internal passages defined within the tool, the multiple internal passages including a first stem channel, a second stem channel, a third stem channel, a first curved channel, a second curved channel, and a third curved channel, wherein the first stem channel is connected to a first inlet, the second stem channel is connected to a second inlet, and the third stem channel is connected to a third inlet, and wherein the first curved channel extends outward from the first stem channel to the first outlet such that the first outlet is a greater distance from the rotational axis than the first stem channel is, the second curved channel extends outward from the second stem channel to the second outlet such that the second outlet is a greater distance from the rotational axis than the second stem channel is, and the third curved channel extends outward from the third stem channel to the third outlet such that the third outlet is a greater distance from the rotational axis than the third stem channel is, wherein the first inlet is open through an exterior surface of the machine interface, the second inlet is open through the exterior surface of the machine interface, and the third inlet is open through the exterior surface of the machine interface.

9. The tooling assembly of claim 8, wherein a cross-sectional size of the first curved channel varies from the first stem channel to the first outlet.

10. The tooling assembly of claim 8, wherein at least one internal passage of the multiple internal passages has a tapered portion connecting the corresponding stem and the curved channels.

11. The tooling assembly of claim 8, wherein the multiple outlets further include a fourth outlet, wherein the multiple internal passages further includes a fourth stem channel and a fourth curved channel, wherein the fourth stem channel is connected to a fourth inlet and the fourth curved channel extends outward from the fourth stem channel to the fourth outlet such that the fourth outlet is a greater distance from the rotational axis than the fourth stem channel is.

12. The tooling assembly of claim 8, wherein the first curved channel curves outward along an arcuate path and the first stem channel joins the first curved channel.

* * * * *